(12) United States Patent
Namgoong (10) Patent No.: US 7,760,919 B2
(45) Date of Patent: Jul. 20, 2010

(54) IRIS AUTHENTICATION APPARATUS WITH OPTICAL BANDPASS FILTER AND ADJUSTABLE FIXED FOCUS LENS

(75) Inventor: Jong Namgoong, Seoul (KR)

(73) Assignee: Jiris Co., Ltd., Seoul (KR)

( * ) Notice: Subject to any disclaimer, the term of this patent is extended or adjusted under 35 U.S.C. 154(b) by 944 days.

(21) Appl. No.: 11/278,596

(22) Filed: Apr. 4, 2006

(65) Prior Publication Data

US 2007/0171297 A1    Jul. 26, 2007

(30) Foreign Application Priority Data

Jan. 20, 2006    (KR) ...................... 10-2006-0006104

(51) Int. Cl.
*G06K 9/00*    (2006.01)
(52) U.S. Cl. .......................... 382/117; 348/78; 348/342
(58) Field of Classification Search ................. 382/117; 348/78, 335, 342, 345; 340/5.53, 5.83
See application file for complete search history.

(56) References Cited

U.S. PATENT DOCUMENTS

| 4,130,357 | A  | * | 12/1978 | Erlichman et al. | .......... 396/483 |
| 4,496,229 | A  | * | 1/1985  | Ogasawara        | .................. 396/133 |
| 5,801,763 | A  | * | 9/1998  | Suzuki           | ......................... 348/77 |
| 6,289,113 | B1 | * | 9/2001  | McHugh et al.    | .............. 382/117 |
| 6,483,930 | B1 | * | 11/2002 | Musgrave et al.  | ........... 382/117 |
| 6,850,631 | B1 | * | 2/2005  | Oda et al.       | .................... 382/117 |
| 2002/0174346 | A1 | * | 11/2002 | Ting           | ........................... 713/186 |
| 2004/0132491 | A1 |   | 7/2004 | Kim et al. | |
| 2006/0140454 | A1 | * | 6/2006 | Northcott et al. | ............ 382/117 |

FOREIGN PATENT DOCUMENTS

KR    10-2004-0059068       12/2002
KR    10-2004-0063431 A      7/2004

OTHER PUBLICATIONS

Universal Serial Bus. (Mar. 2005) Wikipedia.*
Shim, R. (Jul. 2004) "Sony lowers price of memory sticks." CNET News.*

* cited by examiner

*Primary Examiner*—Brian P Werner
*Assistant Examiner*—Barry Drennan
(74) *Attorney, Agent, or Firm*—Pepper Hamilton LLP (57) ABSTRACT

The present invention generally relates to a photographing apparatus for iris authentication, a photographing module for iris authentication, and a terminal having the photographing apparatus for iris authentication, and the photographing apparatus for iris authentication in accordance with the present invention comprises: a body case whose front side is open; a camera module disposed inside the body case, generating an iris pattern image by photographing iris patterns while generating a general image by photographing a general object, and consisting of a housing, a lens module moving in front/rear directions, and a pickup device for converting an image incident through the lens module into an electric signal; a band pass filter disposed in front of the camera module, and transmitting 400 to 1000 nm wavelength beams in more than 50%, among beams incident on the lens module; and an LED lamp disposed around a front side of the camera module, and irradiating infrared wavelength beams forward.

24 Claims, 6 Drawing Sheets

IRIS AUTHENTICATION APPARATUS WITH OPTICAL BANDPASS FILTER AND ADJUSTABLE FIXED FOCUS LENS

CROSS-REFERENCE TO RELATED APPLICATIONS

This application claims priority to Korean Patent Application No. 10-2006-0006104 filed Jan. 20, 2006 which is hereby incorporated by reference in its entirety.

BACKGROUND

The present invention relates to a photographing apparatus for iris authentication, a photographing module for iris authentication, and a terminal having the photographing apparatus for iris authentication, and more specifically, to a photographing apparatus for iris authentication which is used for an identification system and can be employed as a general camera and for iris authentication purposes by using a band pass filter that transmits some of wavelengths in visible ray areas as well as wavelengths of infrared areas, with the use of a filter for filtering incident beams, a photographing module for iris authentication which photographs, converts, and codes iris patterns by being equipped with a photographing apparatus for iris authentication that photographs iris patterns and an image conversion module that codes the photographed iris patterns, and a terminal having the photographing apparatus for iris authentication.

When visitors are coming and going from the building or accessing machinery or data to use it, the identification system is used to keep safe and control the access by authenticating the visitors. Such a prior identification system usually authenticates visitors through password inputting or cards, but nowadays a biometric authentication system which uses biological features of a human being is largely accepted so as to increase security. The biometric authentication system recognizes special features of the human body such as fingerprints, voice, facial shapes, venous patterns, and the iris of a visitor, and compares the recognized features with registered data to identify a recognized person (visitor). Particularly, the iris of a person has different patterns, and these iris patterns are complete between 2 and 3 years after the person's birth, and rarely change since then. Furthermore, the iris patterns show excellent benefits compared to other features of the human body in terms of diversity and a distinctive property. Therefore, various technologies of identifying visitors by using the iris are recently suggested for some places that require high-level security, such as entrances of buildings or safes of banks.

The above identification system through iris authentication generally consists of: a photographing apparatus for photographing iris patterns of a recognized person; an image reader for reading an image of the iris patterns inputted after being photographed by the photographing apparatus; a storage for storing the read image (iris pattern images) and the compared image (iris authentication image) of the iris patterns; and a controller for confirming the read results of the image reader. Thus, since the identification system through iris authentication identifies the visitor by comparing the iris pattern image photographed by the photographing apparatus with the pre-registered iris authentication image, performance of the photographing apparatus would be a very important factor.

A prior photographing apparatus for iris authentication comprises: a camera for photographing iris patterns of a recognized person and sending the photographed iris patterns; a lighting means for providing a light necessary for the photographing of the camera; a distance measurer (sensor) for measuring a distance up to the iris from the camera; and a focal distance controller for controlling a focal distance of a lens according to a signal inputted from the distance measurer. The above prior photographing apparatus for iris authentication controls the iris of the recognized person such that the controlled iris can be accorded with a focal shaft of the camera, and measures the distance up to the iris through the distance measurer to control a lens focus of the camera according to the measured distance, then photographs an iris image. Accordingly, it requires a series of processes of measuring the distance up to the iris from the camera and controlling the lens focus according to the measured distance, consuming a lot of time for photographing an iris pattern image of the visitor. As a result, the distance measurer for automatic focus controlling and the controller for controlling the distance measurer are indispensable, causing a structure to be complicated to increase a cost.

In addition, the prior photographing apparatus for iris authentication uses an analog-type camera, thereby requiring a separate converting device for converting the photographed iris patterns into a digital signal. Moreover, a very high intensity of illumination is demanded, resulting in an installation of a separate lighting apparatus and a lighting controller. Thus, it produces a complex structure.

To solve these problems, a photographing apparatus for iris authentication which uses a digital camera has been suggested. However, the digital camera itself has a problem that a quality of a photographed image largely depends on brightness and a location of a lighting apparatus. Especially, in case an object is photographed with the digital camera in a poorly-illuminated condition, the image may be partially stained apart from peripheral color arrangements. So, it is impossible to exactly photograph the object for iris authentication in such a low-intensity environment, thereby requiring a high-intensity light source having more than a certain level. In particular, if an LED lamp is used as a light source, a lot of LED lamps are essential, causing a problem that a structure for controlling the lamps gets complicated while a manufacturing cost is increased. Furthermore, the photographing apparatus may be larger in weight and size, making it difficult to carry the apparatus. And, it needs a wide installation space. As a result, it is unavailable to universally use the prior photographing apparatus like a general camera, except using it for iris authentication purposes only due to a limited installation space.

SUMMARY

It is therefore an object of the present invention to provide a photographing apparatus for iris authentication which can photograph a clear image without a separate focal distance controlling means, reduce a manufacturing cost by simplifying a structure through a simple configuration of a lighting structure, increase user convenience as well as portability by decreasing the size of an apparatus, and be used as a general camera in addition to iris authentication purposes by using a band pass filter that transmits some of wavelengths of visible ray areas together with wavelengths of infrared areas, among incident beams.

It is another object of the present invention to provide a photographing module for iris authentication which photographs iris patterns and codes the photographed iris patterns, by being equipped with a photographing apparatus for iris authentication that photographs the iris patterns and an image conversion module that converts and codes the photographed iris patterns.

It is another object of the present invention to provide a terminal having the photographing apparatus for iris authentication, which improves security through iris authentication by being equipped with a photographing apparatus for iris authentication that photographs iris patterns, an image conversion module that converts and codes the photographed iris patterns, and a module that compares/reads the coded iris patterns to authenticate a recognized person, and which uses the photographing apparatus for iris authentication as an attached general digital camera.

BRIEF DESCRIPTION OF THE DRAWINGS

Embodiments of the present invention will now be described, by way of example only, with reference to the attached figures, wherein.

DETAILED DESCRIPTION

To solve the above objects, the photographing apparatus for iris authentication in accordance with the present invention photographs iris patterns of a recognized person for iris authentication, and photographs a general object, comprising: a body case whose front side is open; a camera module disposed inside the body case, generating an iris pattern image by photographing iris patterns while generating a general image by photographing a general object, and consisting of a housing, a lens module moving in front/rear directions, and a pickup device for converting an image incident through the lens module into an electric signal; a band pass filter disposed in front of the camera module, and transmitting 400 to 1000 nm wavelength beams in more than 50%, among beams incident on the lens module; and an LED lamp disposed around a front side of the camera module, and irradiating infrared wavelength beams forward.

Desirably, the body case is composed of a terminal that authenticates the recognized person by using an iris pattern image and the second input/output port connected through a cable, and the photographing apparatus for iris authentication is supplied with power from the terminal through the cable, and transmits the generated iris pattern image to the terminal. The lens module has a focus lens having a fixed focal distance, and the focal distance is ranged between 8 and 35 mm. Also, a screw thread is formed in the mobile range of the lens module along the inner circumference of the housing, and a screw thread is formed along the outer circumference of the lens module, so that the screw thread of the housing can be coupled with the screw thread of the lens module. In addition, the lens module and the pickup device are farther distanced during iris photographing, compared to a case when a general object is photographed. At this time, the distance between the lens module and the pickup device can be manually or automatically controlled. The band pass filter transmits 750 to 1000 nm wavelength bands of beams in 80 to 95% among incident beams, transmits 400 to 750 nm wavelength bands of beams in 50 to 80%, and desirably, it transmits 750 to 1000 nm wavelength bands of beams in 90 to 95% among the incident beams, and transmits 400 to 750 nm wavelength bands of beams in 55 to 65%.

Also, the band pass filter includes an area identifiably displayed to show the overall iris when the iris of the recognized person is located within a focal distance of the lens module during the photographing of iris patterns. For the pickup device, it is available to use an optical signal sensor including a CCD (Charge Coupled Device) having more than ¼ inch, which can photograph at low intensity of illumination, or an optical signal sensor including a CMOS (Complementary Metal Oxide Semiconductor) having more than ¼ inch. And, it is desirable to use an infrared (IR) LED lamp for the LED lamp, and only one LED lamp is equipped in a lower part of a front side of the camera module. Likewise, it is recommended that the LED lamp should irradiate an 850 nm single-wavelength beam while a condensing area should be expanded at more than 40° angle, and the lamp should be disposed within 1 cm from a center of the lens module.

It is another object of the present invention to provide a photographing module for iris authentication in accordance with the present invention consists of a photographing apparatus for iris authentication that photographs iris patterns of a recognized person for iris authentication while photographing a general object, and an image conversion module that converts an image of the iris patterns photographed by the photographing apparatus for iris authentication into a code, comprising: a camera module composed of a lens module that configures a focus lens having a fixed focal distance by arraying more than one lens in a line and that moves in front/rear directions, and a pickup device that converts an image incident through the lens module into an electric signal by being disposed on a rear side of the lens module, and generating an iris pattern image by photographing iris patterns while generating a general image by photographing a general object, and wherein the lens module and the pickup device are farther distanced during iris photographing compared to a case when the general object is photographed; a band pass filter that transmits 400 to 1000 nm wavelength beams in more than 50% among beams incident on the lens module, by being disposed in front of the camera module; and an LED lamp that irradiates an infrared wavelength band of a beam for photographing the iris patterns forward, by being disposed around a front side of the camera module; and wherein the image conversion module consists of a temporary memory for storing the iris pattern image, and an image processor for converting the iris pattern image into a code and generating the iris pattern code.

Desirably, the image conversion module further comprises a terminal that authenticates a recognized person by using the iris pattern code, and an interface that transmits the iris pattern code in connection with the terminal. The interface communicates/connects with the terminal through a wired network using the Ethernet or a wireless network using either a CDMA form or a GSM form. Also, for the image processor, one of DSP (Digital Signal Processing) and ROM-type chips is selected.

Moreover, to accomplish another object, a terminal having the photographing apparatus for iris authentication in accordance with the present invention is equipped with the photographing apparatus for authentication that photographs iris patterns of a recognized person and a general object to give rights to use and access by authenticating the iris of the recognized person through the photographing of the iris patterns of the recognized person, comprising: the photographing apparatus for iris authentication that generates an iris pattern image by photographing the iris patterns of the recognized person, and generates a general image by photographing the general object; and an image conversion module that converts the iris pattern image photographed by the photographing apparatus for iris authentication into a code; and wherein the photographing apparatus for iris authentication comprises: a camera module composed of a lens module that configures a focus lens having a fixed focal distance by arraying more than one lens in a line and that moves in front/rear directions, and a pickup device that converts an image incident through the lens module into an electric signal by being disposed on a rear side of the lens module, and generating an iris pattern image by photographing iris patterns while generating a general image by photographing a general object, and wherein the lens module and the pickup device are farther distanced during iris photographing compared to a case when the general object is photographed; a band pass filter that transmits 400 to 1000 nm wavelength beams in more than 50% among beams incident on the lens module, by being disposed in front of the camera module; and an LED lamp that irradiates an infrared wavelength band of a beam for photographing the iris patterns forward, by being disposed around a front side of the camera module; and wherein the image conversion module includes a temporary memory for storing the iris pattern image and an image processor for converting the iris pattern image into a code to generate the iris pattern code; and wherein the iris authentication of the recognized person is conducted by comparing the iris pattern code with an iris authentication code registered by previously photographing iris patterns of a user permitted to access the terminal.

Desirably, the terminal consists of a local connector for data communication within the terminal, a memory for storing the iris authentication code, and a processor for authenticating the recognized person by comparing the iris pattern code with the iris authentication code. And, the image conversion module further comprises an interface that transmits the converted iris pattern code in connection with the local connector. The interface and the local connector are connected together through one of UART (Universal Asynchronous Receiver/Transmitter), PS/2, and USB (Universal Serial Bus) terminals. Also, the processor controls the terminal to access a DB server and a remote authentication server that provides a particular service to the recognized person, according to the compared results of the iris authentication code and the iris pattern code. One of CF card, XD card, smart media, memory stick, and smart card memories is selected as the memory. More desirably, the terminal further comprises an output device that carries out at least one of display and alarm outputting processes for the compared results of the iris authentication code and the iris pattern code. For the terminal, one of PC, PDA, portable phone, navigation, DMB and PMP terminals can be selected.

The present invention now will be described more fully hereinafter with reference to the accompanying drawings, in which typical embodiments of the invention are shown.

Figure 1:
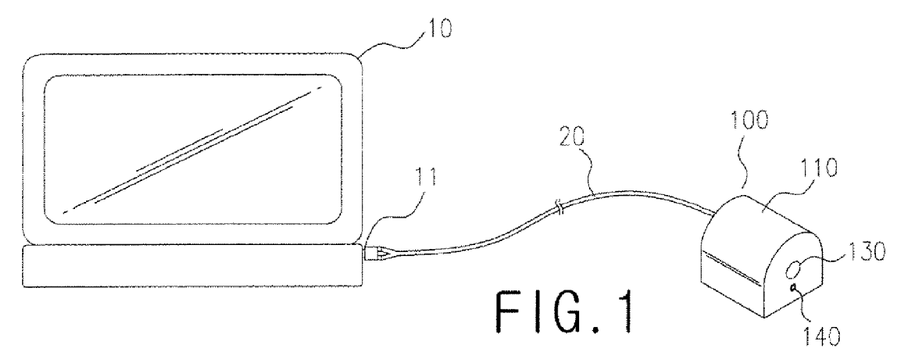
FIG. 1 is a diagram illustrating a configuration of an identification system applied with a photographing apparatus for iris authentication in accordance with the present invention.

FIG. 1 is a diagram illustrating a configuration of an identification system applied with a photographing apparatus for iris authentication in accordance with the present invention. Like shown in FIG. 1, the identification system in accordance with the present invention consists of a photographing apparatus (100) for iris authentication that photographs iris patterns of a recognized person (visitor), and a terminal (10) that conducts the iris authentication by comparing whether an image of the iris patterns photographed by the photographing apparatus for iris authentication is identical with an image of pre-registered iris patterns. The photographing apparatus (100) for iris authentication and the terminal (10) are connected together through a cable (20). The iris authentication with the terminal (10) is carried out by mutually comparing a converted code with a code of the pre-registered iris pattern image, after converting the image of the iris patterns photographed by the photographing apparatus (100) for iris authentication into the code. From now on, the image created by photographing the iris patterns by the photographing apparatus (100) for iris authentication is called an 'iris pattern image', and the code created by converting the iris pattern image is called an 'iris pattern code'. And, to compare with the iris pattern image, a pre-registered image of iris patterns of a user permitted to access the terminal (10) is called an 'iris authentication image', and a code created by converting the iris authentication image is called an 'iris authentication code'.

The photographing apparatus (100) for iris authentication in accordance with the present invention generates the iris pattern image by photographing a recognized person, that is, a visitor of a building or photographing the iris patterns of the user of the terminal (10), or generates a general image by photographing a general object. The photographing apparatus (100) for iris authentication is supplied with power from the terminal in connection with the terminal (10) through the cable (20) for iris authentication, and transmits the generated iris pattern image. Meanwhile, it is possible to separately configure the cable for providing the power to the photographing apparatus (100) for iris authentication from the terminal (10) and a cable for sending the iris pattern image, respectively. Also, it is needless to say that the power can be supplied to the photographing apparatus (100) for iris authentication through a separate power supply means such as a battery or an adapter except the terminal (10). On this occasion, if the battery is used as the power supply means, it is desirable to use a secondary battery. On the other hand, the photographing apparatus (100) for iris authentication can further comprise a module that converts the generated iris pattern image into an iris pattern code. Each component of the photographing apparatus (100) for iris authentication will be described below in detail.

The terminal (10) in accordance with the present invention supplies power to the photographing apparatus (100) for iris authentication, receives the iris pattern image from the photographing apparatus to compare the received image with a pre-registered iris authentication image, and gives a right to use and access the terminal according to the compared results. Specifically, the terminal (10) converts the received iris pattern image into the iris pattern code, and compares the iris pattern code with the iris authentication code to authenticate a recognized person. In the meantime, it is possible to configure that the iris pattern image generated from the photographing apparatus (100) for iris authentication is converted into the iris pattern code through a separate module, and the terminal (10) immediately receives the iris pattern code to compare the received code with the iris authentication code.

The terminal (10) in accordance with the present invention is equipped with an input device, a memory, a processor, and an output device. For instance, one of PC, PDA, portable phone, navigation, DMB and PMP terminals can be used as the terminal. Furthermore, the terminal (10) has a first input/output port (11) connected to the cable (20). A common serial or parallel port is used as the first input/output port (11). In case a PC is used as the terminal, it is desirable to use a PS/2 or USB (Universal Serial Bus) terminal as the first input/output port. Generally, about ±5V voltage is applied to the USB terminal, and the applied voltage is supplied to the photographing apparatus (100) for iris authentication through the cable (20), thereby providing power. In the case of the photographing apparatus (100) for iris authentication in accordance with the present invention, it is possible to drive the apparatus with a low power, thus the apparatus can be driven with the power only, which is supplied from the USB terminal without an additional device. On the other hand, when a portable phone is used as the terminal, it is desirable to use a UART (Universal Asynchronous Receiver/Transmitter) terminal as the first input/output port (11).

Meanwhile, the iris authentication code compared with the iris pattern code is stored in the memory of the terminal (10), and an application for comparing the iris pattern code with the iris authentication code is installed in the memory. One of CF card, XD card, SD card, smart media, memory stick and smart card memories can be used as the memory, and desirably, it is recommended to use a high-capacity 500-megabyte or 1-gigabyte memory. The iris authentication code stored in the memory is a registered code which is created by converting the previously photographed iris authentication image with the use of the photographing apparatus (100) for iris authentication by a user given a right to access and use. The application loads the iris authentication code stored in the memory, and compares the loaded code with the received iris pattern code to presume equality of the two codes. The compared results of the iris pattern code are outputted as an alarm or in display type of a particular message through the output device of the terminal (10), and an access to information stored in the terminal or a terminal use is permitted or prohibited according to the compared results. Besides, an external device given a right to access and use according to the iris authentication results, for instance, an opening/closing device of an entrance or a safe can be connected to the terminal (10). In this case, the compared results of the iris pattern code are transmitted to the external device, there by controlling an opening/closing function of the external device. And, a remote system that provides a special service to a recognized person via the terminal (10) can be included in the external device. For example, if a PC functions as the terminal, the external device may be an Internet banking system or other web service system. And, if a portable phone functions as the terminal, the external device may be a mobile banking system or other mobile service system. At this moment, according to the compared results of the iris pattern code, the terminal (10) controls an access to the above system, more specifically, to an authentication server and a DB server of the system. Therefore, since a legal user only of the terminal which functions as a service provider can access the terminal, prior to user authentication by the authentication server of the system, security can be remarkably improved while a user authentication process can be simplified.

Figure 2:
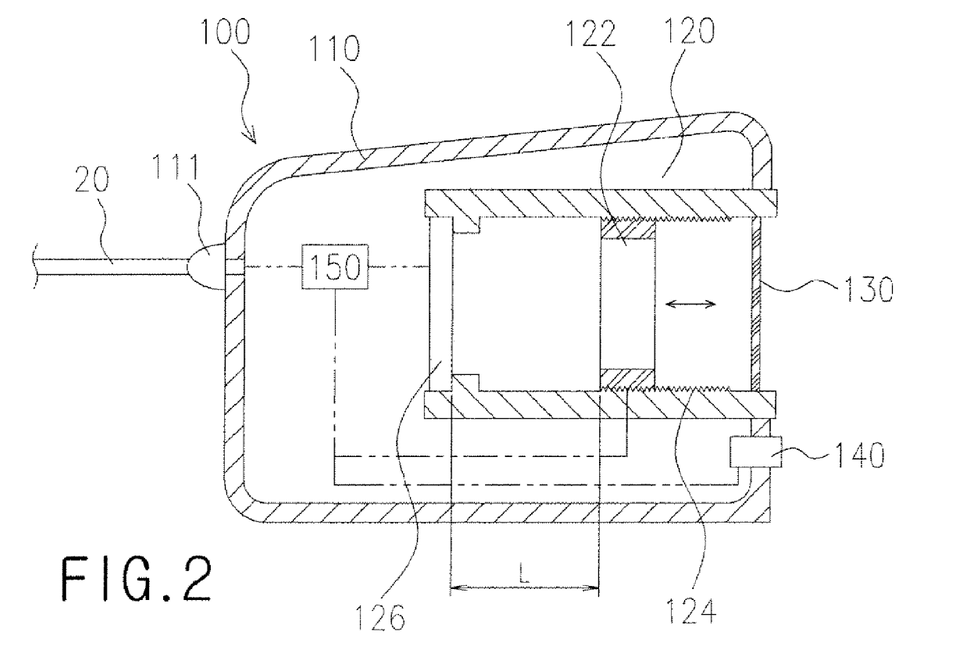
FIG. 2 is a sectional view in length direction of a photographing apparatus for iris authentication in accordance with the present invention.
Figure 3:
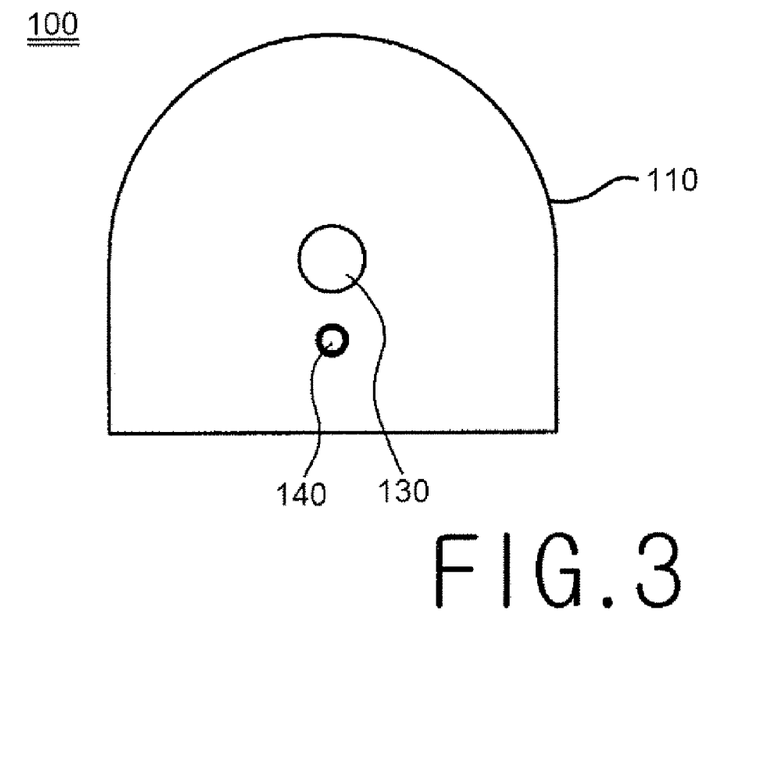
FIG. 3 is a front view of a photographing apparatus for iris authentication in accordance with the present invention.
Figure 4:
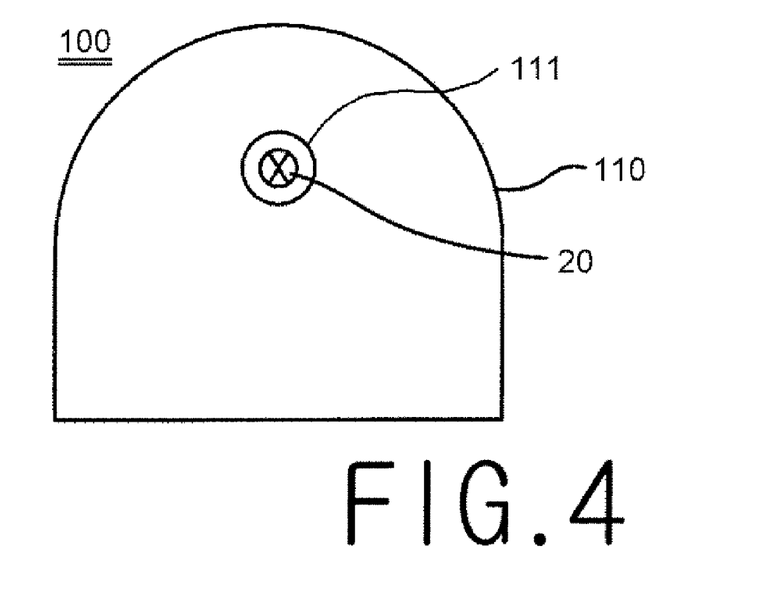
FIG. 4 is a rear view of a photographing apparatus for iris authentication in accordance with the present invention.

FIG. 2 through FIG. 4 are diagrams illustrating a photographing apparatus for iris authentication, FIG. 2 is a sectional view in length direction of the photographing apparatus for iris authentication in accordance with the present invention, FIG. 3 is a front view of the photographing apparatus for iris authentication in accordance with the present invention, and FIG. 4 is a rear view of the photographing apparatus for iris authentication in accordance with the present invention. Referring to FIG. 2 through FIG. 4, a configuration and an operation of the photographing apparatus for iris authentication in accordance with the present invention will be described as follows.

A photographing apparatus (100) for iris authentication in accordance with the present invention comprises a body case (110), a camera module (120) for photographing iris patterns of a recognized person and a general object by being installed inside the body case, a band pass filter (130) for transmitting beams of visible ray and infrared wavelength bands among beams incident on the camera module, an LED lamp (140) for irradiating wavelength bands of beams proper for photographing the iris patterns forward, by being disposed in front of the camera module, and a controller (150) for controlling operations of the camera module and the LED lamp.

The body case (110) in accordance with the present invention is a housing that covers and protects each component of the photographing apparatus (100) for iris authentication, being equipped with a second input/output port (111) connected to a cable (20) on one side. The photographing apparatus (100) for iris authentication is supplied with power in connection with the terminal (10) through the second input/output port (111), and transmits a photographed iris pattern image. On the other hand, in case the cable for power supply and a cable for data transmission are separately comprised, it is needless to say that the body case (110) can be equipped with separate power supply/data transmission ports, respectively, instead of the second input/output port (111). In addition, when power is supplied to the photographing apparatus (100) for iris authentication through a separate power supply means such as a battery including a secondary battery or an adapter except the terminal (10), the body case (110) further comprises a battery receiver where the battery is mounted, or a port for connecting the adapter, together with the second input/output port (111).

The camera module (120) in accordance with the present invention is a configuration part for generating an iris pattern image by photographing the iris patterns of the recognized person or generating a general image by photographing a general object, and comprises a lens module (122) and a pickup device (126) for converting an image incident through the lens module into an electric signal. The lens module (122) is a focus lens where a focal distance is fixed, and is configured to control a distance between the lens module and the pickup device (126) so as to offer a macro (close-up) function while the iris patterns are photographed. The band pass filter (130) that transmits certain wavelength beams only among beams incident on the camera module is disposed in front of the camera module (120). As the camera module (120), it is possible to use a camera module applied to a portable phone or PC terminal or to use a camera module applied to a general digital camera. In detail, the band pass filter can be applied to a digital camera module using a focus lens.

The lens module (122) in accordance with the present invention is composed of a focus lens having a fixed focal distance by disposing plural lenses in a line. Commonly, when small-sized photos are shot, it is available to use either a focus lens or a zoom lens as the camera lens with no big difference in terms of resolution and quality. However, when the photos are expanded, the difference can be gradually bigger. Thus, when large-sized printing photos are shot, the focus lens is used. Since the photographing apparatus (100)

for iris authentication in accordance with the present invention should precisely photograph and analyze very small targets such as patterns of the iris, it is better to use the focus lens as the lens module (122). A focal distance of the lens module (122) would be between 8 and 35 mm.

Like mentioned above, a distance between the lens module (122) in accordance with the present invention and the pickup device (126) is controlled to provide a macro (close-up) function while the iris patters are photographed. More specifically, given that the distance between the lens module (122) and the pickup device (126) is 'L', the 'L' can be bigger in case of photographing the iris patterns(macro mode), compared to a case of photographing a general image. That is, since the lens module (122) moves forward during the iris photographing and is farther distanced from the pickup device (126), an iris of a recognized person located within the shortest photographing range of the lens module can be clearly photographed. At this point, it is desirable to form screw threads (124) on a contact surface between the housing of the camera module (120) and the lens module in order to finely control a position of the lens module (122). In detail, one of the screw threads (124) is formed in the mobile range of the lens module (122) along the inner circumference of the housing, and the other one of the screw threads is formed along the outer circumference of the lens module as well. Accordingly, the position of the lens module (122) can be precisely controlled. And, front/rear directional movements of the lens module (122) through the screw threads (124) are automatically controlled by the controller (150). Namely, the lens module (122) moves forward along the screw threads (124) by operating a driving unit such as a driving motor or a gear according to a control signal of the controller (150) during the photographing of the iris patterns, so that the pickup device (126) and the lens module become more distant. On the contrary, in case of photographing the general object, the lens module moves backward by the control signal of the controller, so that the pickup device and the lens module get closer. In the meantime, it is also possible for a user to manually control the position of the lens module (122).

The pickup device (126) in accordance with the present invention is disposed at the back of the lens module (122), and generates an iris pattern image or a general image by converting an image incident through the lens module into an electric signal, then an operation of the pickup device is controlled by the controller (150). The generated iris pattern image is transmitted to the terminal (10) through the cable (20). It is available to use an optical signal sensor including a CCD (Charged Coupled Device) or a CMOS (Complementary Metal Oxide Semiconductor) as the pickup device (126), and it is desirable to use a CCD or a CMOS having more than ¼ inch to clearly photograph iris patterns in a poorly-illuminated condition.

The band pass filter (130) in accordance with the present invention is disposed in front of the camera module (120), and transmits certain wavelength bands of beams only, among beams incident on the lens module (122). Among the incident beams, the band pass filter (130) transmits most of infrared wavelength bands of beams while transmitting some of visible ray wavelength bands of beams. In order that the photographing apparatus (100) for iris authentication in accordance with the present invention can photograph both iris patterns and general object, the band pass filter (130) should transmit 400 to 1000 nm wavelength beams in at least more than 50%, among the infrared and visible ray wavelength band of beams. In a concrete way, for the incident beams, the band pass filter (130) transmits 750 to 1000 nm beams in about 80 to 95% among the infrared wavelength bands of beams, and transmits 400 to 750 nm beams in about 50 to 80% among the visible ray wavelength bands of beams. In case of visible rays, they have various wavelengths which can be differently recognizable by people. That is, some people can recognize less than 380 nm wavelength beams or more than 770 nm wavelength beams. However, 400 to 750 nm beams recognizable by most people are defined as wavelength bands of the visible rays in the present invention. Also, even though infrared rays generally show 750 nm to 1 mm wavelength beams, 750 to 1000 nm beams required for photographing the iris patterns are defined as wavelength bands of the infrared rays in the present invention.

As transmissivity of visible rays gets higher in the band pass filter (130), a better performance can be obtained when the photographing apparatus (100) for iris authentication in accordance with the present invention is used as a camera for photographing a general object. But, when photographing the iris, transmitted visible rays may function as a noise during pickup. Therefore, like mentioned above, if the transmissivity of the visible rays reaches more than 80%, it is difficult to photograph the iris. On the contrary, if the transmissivity of the visible rays reaches less than 50% in the band pass filter (130), it is impossible to photograph a sufficient color image when the photographing apparatus (100) for iris authentication is used as a general camera. Likewise, in case the transmissivity reaches less than 80% in infrared wavelength bands of the band pass filter (130), a transmissivity of an incident beam that is reflected by the iris after being emitted from the LED lamp (140) deteriorates, causing a problem that an exact iris recognition is impossible. So, since the band pass filter (130) can have the above-mentioned visible ray/infrared transmissivities, all of the infrared and visible ray wavelength bands of beams can be transmitted through the band pass filter, and are incident on the lens module (122), thereby photographing the iris patterns demanding illumination in infrared areas as well as photographing a general object demanding illumination in visible ray areas.

Desirably, it is recommended that the bandpass filter (130) should transmit 400 to 750 nm wavelength beams in 55 to 65% among visible ray wavelength bands, while transmitting 750 to 1000 nm beams in 90 to 95% among infrared wavelength bands. At this time, the infrared wavelength bands transmitted by the band pass filter (130) are defined according to a wavelength range of a beam emitted from the LED lamp (140). Ideally, the band pass filter (130) in accordance with the present invention has a 60% transmissivity in the visible ray wavelength bands, and has a 100% transmissivity in a wavelength band of a light source emitted from the LED lamp (140). More desirably, an LED lamp that emits an 850 nm single wavelength is used as the LED lamp (140) mentioned below, and the bandpass filter (130) has a peak transmissivity in the corresponding band (850 nm).

Meanwhile, the band pass filter (130) in accordance with the present invention forms an identifiably displayed area to present the overall iris when the iris of a recognized person is located within a focal distance of the lens module (122) while iris patterns are photographed, so that the recognized person can control a position of the iris while viewing the area displayed in the band pass filter.

The LED lamp (140) in accordance with the present invention is disposed around the lens module (122) in front of the camera module (120), and irradiates a wavelength band of a beam essential for photographing the iris patterns forward, then an on/off operation of the lamp is controlled by the controller (150). The beam irradiated from the LED lamp (140) is reflected upon the iris of the recognized person, and is incident on the lens module (122) by being transmitted in the band pass filter (130). An IR LED lamp (infrared LED lamp) for irradiating an infrared wavelength beam proper for photographing the iris patterns can be used as the LED lamp (140). In addition, the LED lamp (140) widens an angle of a condensing area at more than 40° to prevent the irradiated beam from being concentrated on one spot, and is disposed within 1 cm from a center of the lens module (122). Accordingly, it can obtain a sufficient distance at which the beam irradiated from the LED lamp (140) can be recognized on the pupil of the recognized person. Meanwhile, the camera module (120) in accordance with the present invention uses a focus lens as the lens module (122), and uses a CCD or a CMOS having more than ¼ inch as the pickup device (126), enabling a precise photographing of the iris patterns even in a poorly-illuminated condition. Thus, one LED lamp (140) would be enough. As a result, a structure for controlling illumination is simplified, while the photographing apparatus (100) for iris authentication can be driven even with a low power provided through the first input/output port (11). Furthermore, like shown in FIG. 1 through FIG. 3, the LED lamp (140) is disposed in a lower part of a front side of the camera module (120), in order to prevent the beam irradiated from the LED lamp (140) from being covered by the eyelashes of the recognized person. Generally, since lower eyelashes of a human being tend to be shorter than upper eyelashes, the LED lamp would be located in the lower part of the front side of the camera module. On this occasion, it is needless to say that the beam irradiated from the LED lamp should be inclined at predetermined angle upward, so as to exactly illuminate the iris of the recognized person.

Figure 5:
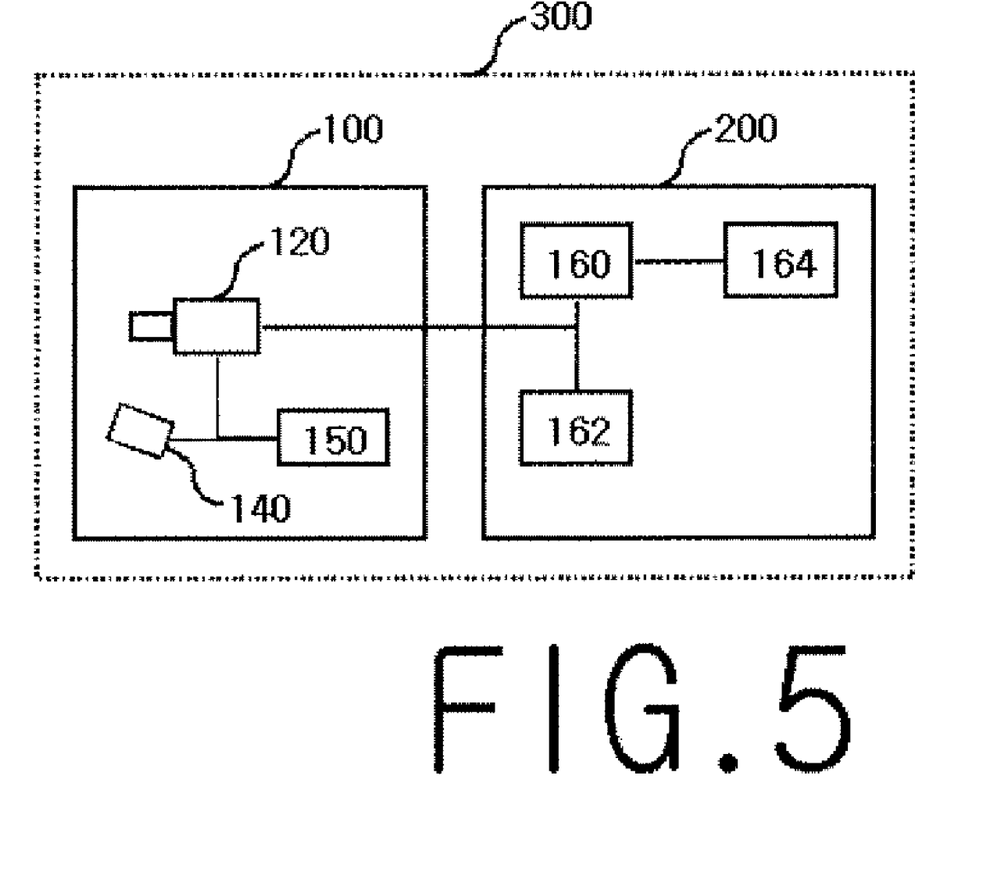
FIG. 5 is a block format diagram of a photographing module for iris authentication in accordance with the present invention.

FIG. 5 is a block format diagram of a photographing module for iris authentication in accordance with the present invention. Like shown in FIG. 5, a photographing module (300) for iris authentication in accordance with the present invention consists of a photographing apparatus (100) for iris authentication that generates an iris pattern image by photographing iris patterns of a recognized person, and an image conversion module (200) that generates an iris pattern code by converting the iris pattern image generated by the photographing apparatus for iris authentication. The image conversion module (200) is composed of an image processor (160) for converting the iris pattern image into the iris pattern code, a temporary memory (162) for storing the iris pattern image, and an interface (164) for transmitting the converted iris pattern code to the terminal (10).

The image processor (160) in accordance with the present invention converts the iris pattern image which is stored in the temporary memory (162) by being photographed and generated in a camera module (120), and generates the iris pattern code. At this time, the iris pattern image stored in the temporary memory (162) by being photographed in the camera module (120) is stored in raw format. The conversion of the iris pattern image can be conducted by a method suggested in No. 10-2005-0025927 of the Korea Publicized Patent, and a DSP (Digital Signal Processing) chip or an ROM-type chip can be used as the image processor (160). Besides, it is desirable to comprise a buffer for temporarily storing the converted iris pattern code before the image processor (160) sends the code through the interface (164). It is also possible that the buffer can be configured separately from the image processor (160).

The temporary memory (162) in accordance with the present invention stores the iris pattern image generated from the camera module (120), and desirably, it temporarily stores the image while the image processor (160) converts the iris pattern image into the iris pattern code. That is, the temporary memory (162) in accordance with the present invention is used as a kind of buffer. In addition, the temporary memory (162) can be included in the image processor (160). In this case, the image processor includes two buffers, storing the iris pattern image photographed by the camera module in the first buffer during the conversion of the image and storing the converted iris pattern code in the second buffer while sending the code through the interface.

The interface (164) in accordance with the present invention transmits the iris pattern code generated by the image processor (160) to the terminal, in connection with the first input/output port (11) of the terminal (10). Also, in communication/connection with the terminal (10), the interface (164) can transmit the iris pattern code to the terminal. Namely, the interface (164) and the terminal (10) can transceive the iris pattern code by being communicated and/or connected through wired and/or wireless networks. For instance, the Ethernet may be used as the wired network, while a CDMA or GSM type may be used as the wireless network. Furthermore, in case the image conversion module (200) is embedded in the terminal (10), the interface (164) is connected to a local connector for data communication within the terminal, and transmits the generated iris pattern code.

The photographing module (300) for iris authentication in accordance with the present invention can further comprise, except the above configurations, a memory for storing an iris authentication code, a processor or application for comparing the iris pattern code with the iris authentication code, and an output device for outputting the compared results. In this case, so as to compare the iris pattern code, it is available to directly carry out the iris authentication by only using the photographing module (300) for iris authentication, without connecting with the separate terminal (10), and to send iris authentication results to an external device by connecting the interface (164) of the photographing module for iris authentication with the external device, thereby controlling an opening/closing motion of the external device. At this moment, the interface (164) and the external device can be connected through a cable or be communicated/connected through wired/wireless networks, for example, the Ethernet and a CDMA or GSM type network. Also, it is possible to include, as the external device, a remote system that provides a particular service to the recognized person, such as an internet banking system or a mobile banking system. In this case, the interface (164) transmits the iris authentication results to an authentication server of the above system through wired/wireless networks.

An iris authentication procedure using the photographing module (300) for iris authentication in accordance with the present invention will be described as follows.

First, power is supplied to the photographing apparatus for iris authentication by connecting the photographing apparatus (100) for iris authentication with the terminal (10) through the cable (20), and an application for comparing the iris pattern code by being installed in the terminal is driven.

And, if the photographing apparatus (100) for iris authentication is converted into a photographing mode for iris patterns instead of a photographing mode for a general image, the camera module (120) is converted into a macro (close-up) photographing mode by the controller (150). In detail, the lens module (122) moves forward along the screw threads (124), making the pickup device (126) and the lens module become distant.

Next, the eyes of the recognized person get near to a front side of the photographing apparatus (100) for iris authentication. At this moment, a position of the eyes of the recognized person is determined by a focal distance of the lens module (122). For instance, if the focal distance of the lens module (122) is 35 mm, a distance up to an end part of the camera module (120) from the eyes of the recognized person is between 25 and 30 cm approximately. Also, if the focal distance of the lens module is 25 mm, the distance up to the end part of the camera module from the eyes of the recognized person is 15 cm approximately. And, if the focal distance of the lens module is 16 mm, the distance up to the end part of the camera module from the eyes of the recognized person is 8 cm approximately. Likewise, if the recognized person controls to illuminate the overall iris in a displayed area of the bandpass filter (130), an exact focus for photographing can be adjusted.

The camera module (120) in accordance with the present invention photographs the iris patterns at certain time intervals under control of the controller (150), and stores the photographed iris pattern image in the temporary memory (162) of the image conversion module (200) in real time. Meanwhile, since a shape of the iris patterns of the recognized person reflected on the camera module (120) is displayed through a monitor of the terminal (10), it is also possible for the recognized person to press a separate photograph button after accurately adjusting a position of the iris.

The image processor (160) of the image conversion module (200) converts the iris pattern image stored in the temporary memory (162) into the iris pattern code, and the converted iris pattern code is transmitted to the terminal (10) through the interface (164).

The application of the terminal (10) loads the iris authentication code stored in the memory, and compares the loaded code with the iris pattern code received from the photographing module (300) for iris authentication. At this time, if many people are given the right to access and use the terminal or the external device, that is to say, if plural iris authentication codes are registered, the received iris pattern code is compared with each of the registered iris authentication codes.

The application of the terminal (10) outputs the compared results of the iris pattern code, and the compared results are outputted through the output device. Namely, if there is an identical iris authentication code through the comparison of the iris pattern code, people are allowed to access and use the terminal or the external device. And, if the identical iris authentication code does not exist, an alarm or an alarm message is outputted to prohibit the access and the use of the terminal or the external device.

It is desirable to display a series of the above iris authentication processes on the monitor of the terminal (10), so that the user can observe the processes.

Meanwhile, like shown in FIG. 1, it is possible to separately configure the terminal (10) and the photographing apparatus (100) for iris authentication without connecting them together through the cable (20), and to integratedly configure the photographing apparatus for iris authentication within the terminal. On this occasion, one of PC, PDA, portable phone, navigation, DMB and PMP terminals can be used as the terminal having the photographing apparatus for iris authentication. A configuration and an operation of the terminal having the photographing apparatus for iris authentication will be now described in reference to FIG. 6 and FIG. 7.

Figure 6:
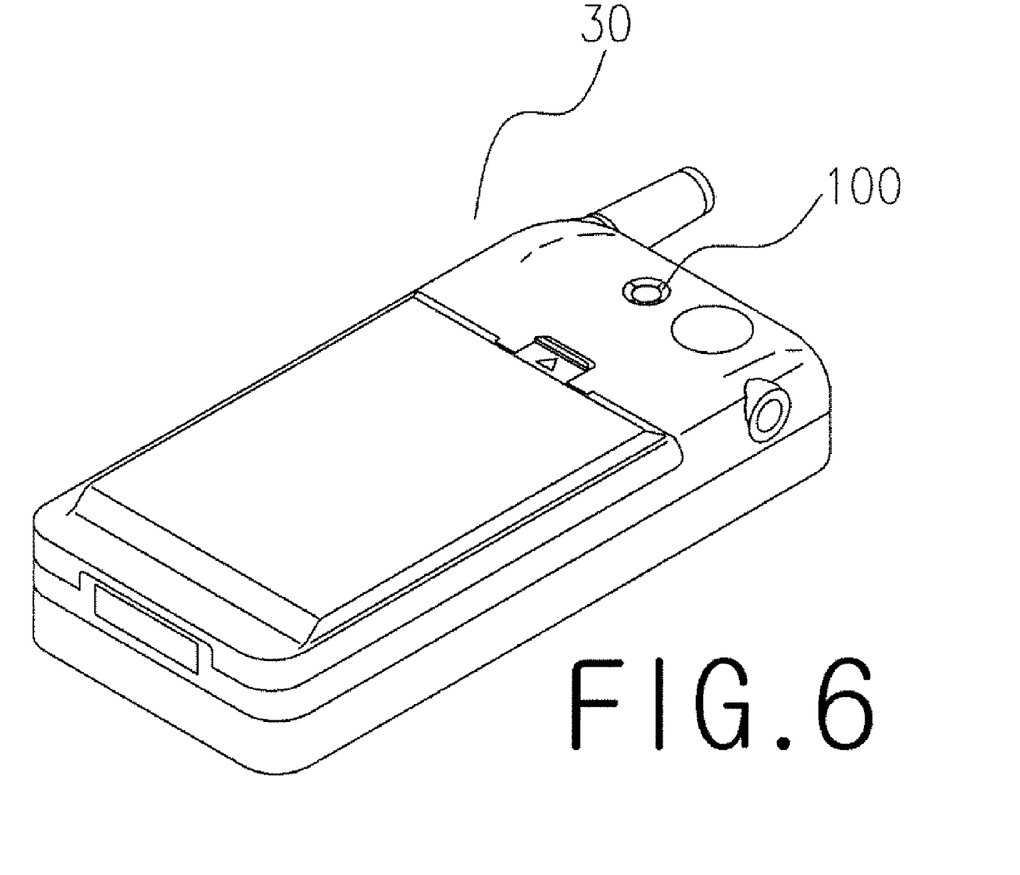
FIG. 6 is a perspective view of a portable phone having a photographing apparatus for iris authentication in accordance with the present invention.
Figure 7:
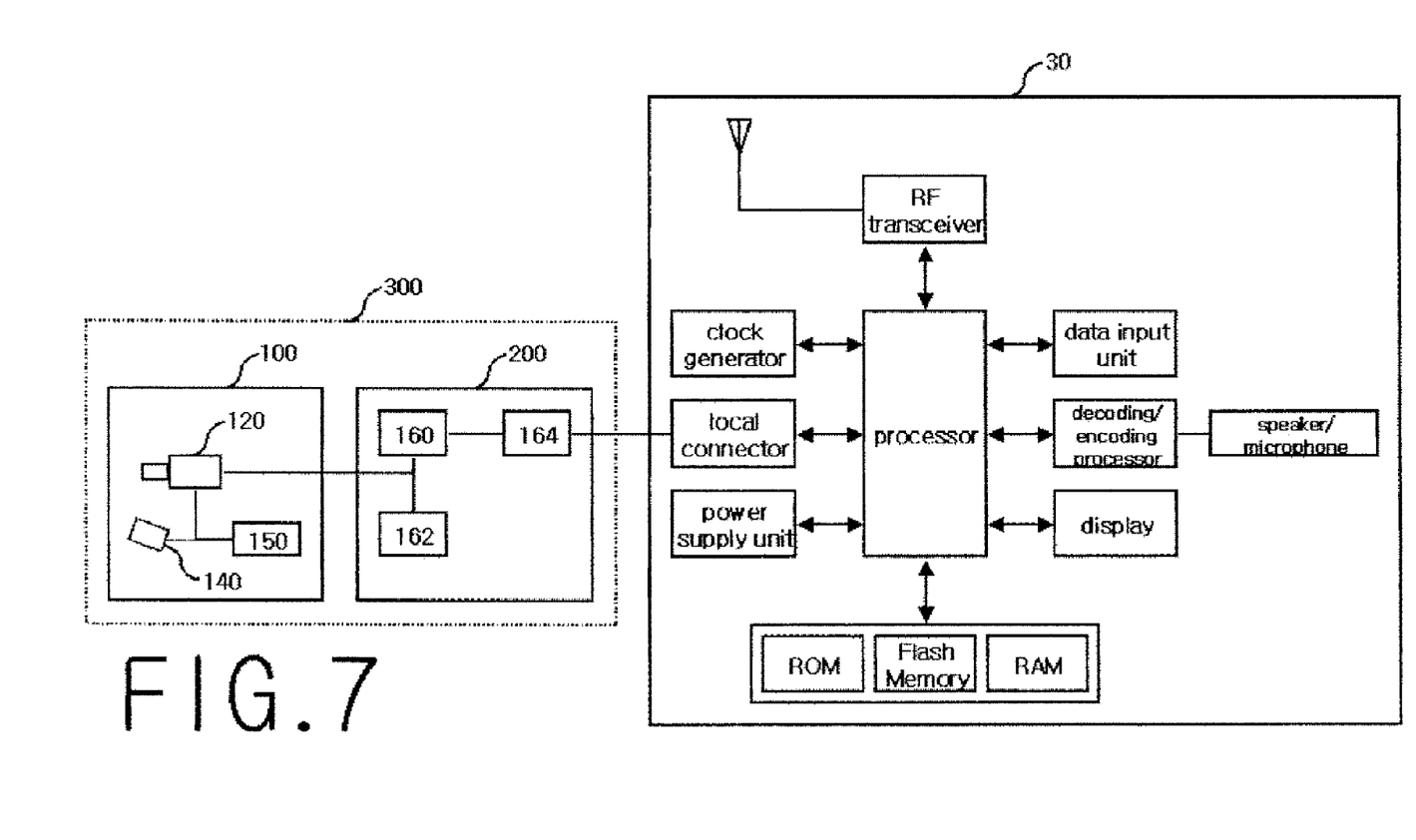
FIG. 7 is a block format diagram of a portable phone having a photographing apparatus for iris authentication in accordance with the present invention.

FIG. 6 and FIG. 7 illustrate an embodiment having a photographing apparatus for iris authentication in a portable phone, FIG. 6 is a perspective view of the portable phone having the photographing apparatus for iris authentication in accordance with the present invention, and FIG. 7 is a block format diagram of the portable phone having the photographing apparatus for iris authentication in accordance with the present invention. Like illustrated in FIG. 6 and FIG. 7, a portable phone (30) having the photographing apparatus for iris authentication in accordance with the present invention comprises a photographing module (300) for iris authentication in a portable phone module.

The portable phone (30) refers to a generally used portable phone, using a common portable phone consisting of an RF transceiver, a clock generator, a local connector, a power supply unit, a data input unit, a decoding/encoding processor, a display, a sound source input/output unit such as a speaker/microphone, a memory such as an ROM, a flash memory, and an RAM, and a processor. At this point, the portable phone (30) receives a transmitted iris pattern code in connection with an interface (164) of an image conversion module (200) through the local connector. The local connector supports data communication within a terminal. Besides, a comparison of the transmitted iris pattern code is conducted by the processor of the portable phone (30) or an application installed in the memory. So, an iris authentication code is stored in the memory of the portable phone (30), and desirably, the code is stored in the ROM or the flash memory, which is a non-volatile memory. More desirably, a high-capacity 500-megabyte or 1-gigabyte memory is used. Like shown above, except the portable phone, PC, PDA, portable phone, navigation, DMB and PMP terminals can be used as the photographing apparatus for iris authentication. In this case, it is available to use a CF card, an XD card, an SD card, smart media, a memory stick, a smart card memory, and others as a memory of the above terminal.

Like shown above, the photographing module (300) for iris authentication consists of a photographing apparatus (100) for iris authentication and the image conversion module (200). And, the photographing apparatus for iris authentication is realized by using a focus lens as a lens module in a camera module applied to the portable phone, and comprising a band pass filter (130) and an LED lamp (140) in front of the camera module. Therefore, the photographing apparatus (100) for iris authentication and the photographing module (300) for iris authentication can be easily realized with the camera module basically equipped in the portable phone (30), thereby reducing a manufacturing cost with no complicated manufacturing process since a structure of the portable phone is not changed a lot. Moreover, the iris authentication can be conducted with the camera module of the portable phone, not to mention a photographing of a general object. An iris pattern image photographed by the camera module (120) is stored in a temporary memory (162) of the image conversion module (200), is converted into an iris pattern code by an image processor (160), and is transmitted to the local connector through the interface (164), thereby carrying out the iris authentication. On this occasion, it is desirable to connect the interface (164) with the local connector through a PS/2, USB or UART (Universal Asynchronous Receiver/Transmitter) terminal.

Now, an iris authentication procedure of the portable phone (30) having the photographing apparatus for iris authentication will be described below.

To conduct the iris authentication, if the photographing apparatus (100) for iris authentication is converted into a photographing mode for iris patterns, the camera module (120) moves forward along the screw threads (124) under control of the controller (150) and becomes distant from the pickup device (126), thereby converting into a macro (close-up) photographing mode.

If the eyes of the recognized person get near to a front side of the photographing apparatus (100) for iris authentication and the recognized person adjusts a focal distance of the lens module (122) while adjusting the iris to a displayed area of the band pass filter (130), the iris patterns start to be photographed.

The iris pattern image photographed by the camera module (120) is transmitted to the temporary memory (162) of the image conversion module (200) and stored in the memory, and the image processor (160) converts the iris pattern image stored in the temporary memory into an iris pattern code. The converted iris pattern code is transmitted to the local connector of the portable phone (30) through the interface (164).

The processor or application of the portable phone (30) loads an iris authentication code stored in the memory (ROM or flash memory), and compares the loaded code with the received iris pattern code. At this time, the received iris pattern code can be temporarily stored in the memory of the portable phone, and desirably, temporarily stored in the RAM.

If the iris pattern code is identical with the iris authentication code through the comparison of the iris patterns, the recognized person is allowed to access information stored in the portable phone (30) or to use the portable phone. And, if not identical, the recognized person is prohibited from accessing the stored information of the portable phone or using the portable phone, and at the same time, an alarm message is outputted through the speaker or the display.

Through a series of the above iris authentication processes, it can prevent the portable phone (30) from being illegally used without permission, while remarkably improving security by protecting personal information.

In the meantime, except the portable phone (30), if one of the above PC, PDA, navigation, DMB and PMP terminals is used as the terminal having the photographing apparatus for iris authentication, it is possible to easily modify the configuration in the same manner as the portable phone, by connecting the photographing module for iris authentication with the local connector of the terminal, storing the iris authentication code in the memory of the terminal, and comparing the iris pattern code with the iris authentication code through the processor or application of the terminal.

At this time, like mentioned above, one of the CF card, XD card, SD card, smart media, memory stick, and smart card memories can be used as the memory of the terminal.

Figure 8:
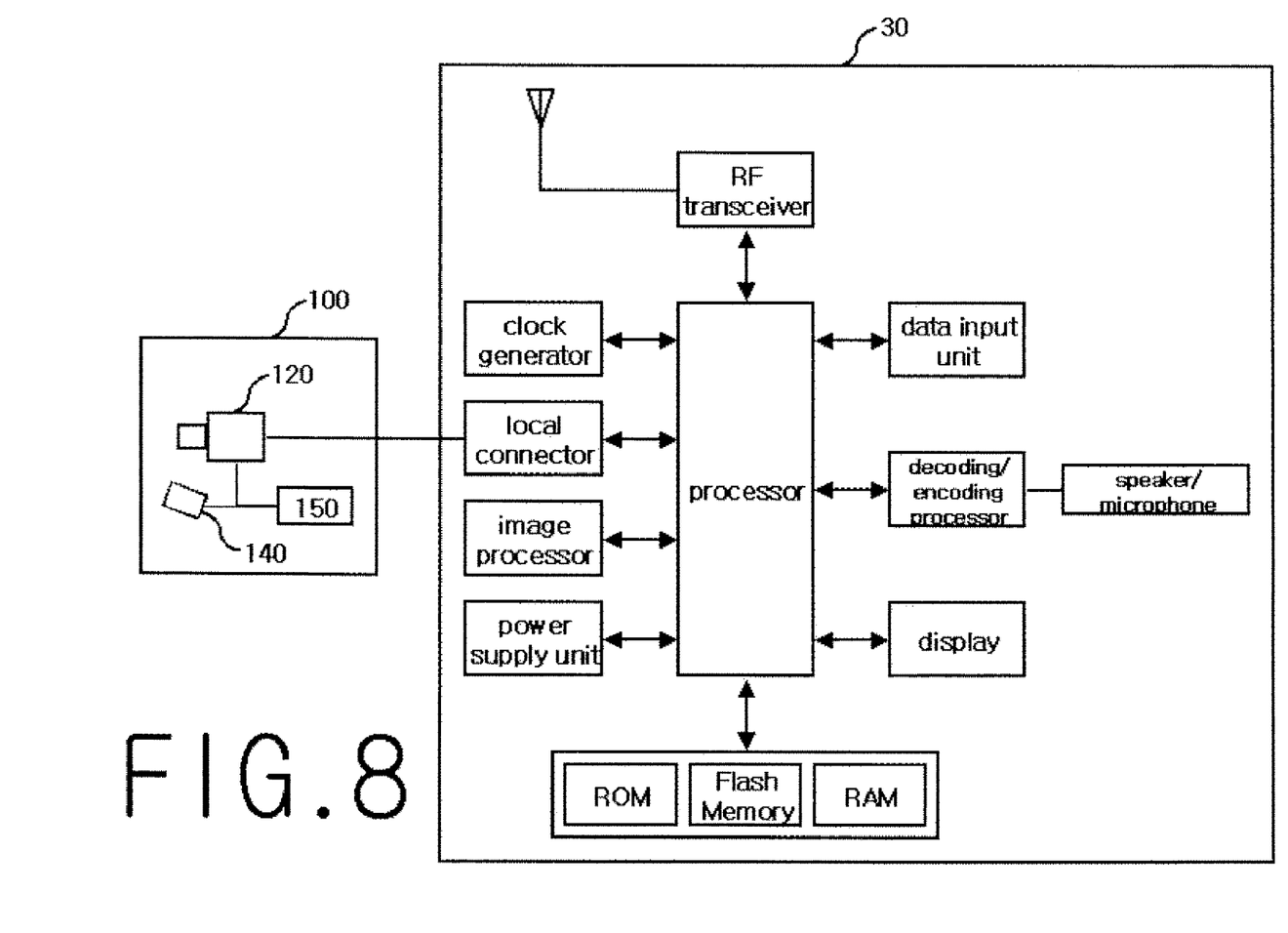
FIG. 8 is a block format diagram of another embodiment of a portable phone having a photographing apparatus for iris authentication in accordance with the present invention.

FIG. 8 is a block format diagram of another embodiment of a portable phone having a photographing apparatus for iris authentication in accordance with the present invention. Like shown in FIG. 8, another embodiment of the portable phone having the photographing apparatus for iris authentication in accordance with the present invention can be realized by comprising an image processor (160) as a component of the portable phone (30) without installing the separate image conversion module (200). In this case, a photographing apparatus (100) for iris authentication is directly connected to the local connector of the portable phone, and the memory (RAM) of the portable phone is used as the temporary memory (162) of the image conversion module. In addition, it is the same as the above configuration that the photographing apparatus (100) for iris authentication is realized by installing the band pass filter (130) and the LED lamp (140) in the camera module used in the portable phone (30). The iris pattern image photographed by the camera module (120) of the photographing apparatus (100) for iris authentication is transmitted to the local connector and stored in the memory (RAM) of the portable phone (30), then is converted into the iris pattern code by the image processor (160). The processor or application of the portable phone loads the iris authentication code stored in the memory (ROM or flash memory) of the portable phone to compare whether the loaded code is identical with the converted iris pattern code, and permits or prohibits usage of the portable phone and stored information of the phone.

On the other hand, unlike the above configuration, it is possible to install a separate image conversion application for converting the iris pattern image into the iris pattern code, instead of the image processor (160) consisting of a separate chip, and to enable the image conversion application to carry out the conversion of the iris pattern image together with the comparison of the iris pattern code.

Effect

As stated so far, a photographing apparatus for iris authentication, a photographing module for iris authentication, and a terminal having the photographing apparatus for iris authentication in accordance with the present invention can be easily miniaturized at a low manufacturing cost thanks to a simple focus adjustment of a lens and a simple controlling structure of lighting equipment, and can be used as a general digital camera that photographs a general object in addition to iris authentication purposes, thereby being highly applicable.

In other words, the photographing apparatus for iris authentication, the photographing module for iris authentication, and the terminal having the photographing apparatus for iris authentication in accordance with the present invention have the following benefits:

First, it is possible to more clearly and precisely photograph iris patterns since the iris patterns are photographed by using a focus lens as a lens module;

Second, a miniaturized and simple structure can be obtained with no need to equip a focal distance controller and a distance measurer for automatic focus adjustment, because a position of the iris can be controlled with the use of an area displayed in a band pass filter after a distance up to the eyes from an end part of a camera is adjusted according to a focal distance of the lens module;

Third, since the focus lens is used as the lens module while a CCD or a CMOS having more than ¼ inch is used as a pickup device, an excellent quality can be acquired even in a poorly-illuminated condition using one LED lamp, resulting in a simplification of a controlling structure for lighting control, and furthermore it is available to drive the photographing apparatus for iris authentication even with a low power provided through an input/output port of the terminal;

Fourth, since the band pass filter can transmit visible ray wavelength bands of beams as well as infrared wavelength bands of beams, a general object can be also photographed in addition to iris patterns, thereby being highly applicable;

Fifth, the present invention can be easily realized, because the band pass filter is applied to the camera module using the focus lens among camera modules of the portable phone and a PC, thereby simplifying a manufacturing process while tremendously reducing a manufacturing cost, as well as implementing an integrated configuration for a general terminal such as the portable phone or the PC; and Finally, a miniaturization is available thanks to a simple structure, so that the user can install the present invention in a desired position or easily carry it.

In the drawings and specification, there have been disclosed typical preferred embodiments of the invention and, although specific terms are employed, they are used in a generic and descriptive sense only and not for purposes of limitations, the scope of the invention being set forth in the following claims.

What is claimed is:

1. A photographing apparatus for authentication that photographs iris patterns of a recognized person for iris authentication and photographs a general object, comprising:

a body case whose front side is open;
a camera module disposed inside the body case, and generating an iris pattern image by photographing the iris patterns while generating a general image by photographing the general object wherein the camera module comprises:
a housing;
a lens module where more than one lens is arrayed in a line, and moving in front/rear directions; and
a pickup device disposed at the back of the lens module, and converting an image incident through the lens module into an electric signal;
a band pass filter disposed in front of the camera module, wherein the band pass filter has a transmittance of 90% to 95% for beams having a wavelength of 750 nm to 1000 nm and a transmittance of 55% to 65% for beams having a wavelength of 400 nm to 750 nm, among beams incident on the lens module; and
an LED lamp disposed around a front side of the camera module, and irradiating infrared wavelength beams forward.

2. The photographing apparatus for iris authentication of claim 1, wherein the body case comprises an input/output port connected to a terminal that authenticates the recognized person by using the iris pattern image through a cable, and the photographing apparatus for iris authentication is supplied with power from the terminal through the cable, and transmits the generated iris pattern image to the terminal.

3. The photographing apparatus for iris authentication of claim 1, wherein the lens module is a focus lens having a fixed focal distance.

4. The photographing apparatus for iris authentication of claim 1, wherein a focal distance of the lens module is between 8 and 35 mm.

5. The photographing apparatus for iris authentication of claim 1, wherein a screw thread is formed in the mobile range of the lens module along the inner circumference of the housing, while a screw thread is formed along the outer circumference of the lens module, so that the screw thread of the housing and the screw thread of the lens module are mutually connected.

6. The photographing apparatus for iris authentication of claim 1, wherein the lens module and the pickup device become more distant during the iris photographing, compared to a case when the general object is photographed.

7. The photographing apparatus for iris authentication of claim 6, a distance between the lens module and the pickup device is automatically controlled.

8. The photographing apparatus for iris authentication of claim 1, wherein the pickup device is an optical signal sensor with a CCD (Charge Coupled Device) having more than ¼ inch, which is capable of photographing at low illumination.

9. The photographing apparatus for iris authentication of claim 1, wherein the pickup device is an optical signal sensor with a CMOS (Complementary Metal Oxide Semiconductor) having more than ¼ inch, which is capable of photographing at low illumination.

10. The photographing apparatus for iris authentication of claim 1, wherein only one LED lamp is equipped in a lower part of a front side of the camera module.

11. The photographing apparatus for iris authentication of claim 1, wherein the LED lamp irradiates an 850 nm single wavelength beam.

12. The photographing apparatus for iris authentication of claim 1, wherein the LED lamp expands an angle of a condensing area at more than 40°, and is disposed within 1 cm from a center of the lens module.

13. In a photographing module for iris authentication comprising a photographing apparatus for iris authentication that photographs iris patterns of a recognized person for the iris authentication and photographs a general object, and an image conversion module that converts an image of the iris patterns photographed by the photographing apparatus for iris authentication into a code,
wherein the photographing apparatus for iris authentication comprises:
a camera module composed of a lens module that configures a focus lens having a fixed focal distance by arraying more than one lens in a line and that moves in front/rear directions, and a pickup device that converts an image incident through the lens module into an electric signal by being disposed on a rear side of the lens module, and generating an iris pattern image by photographing the iris patterns while generating a general image by photographing the general object,
a band pass filter disposed in front of the camera module, wherein the band pass filter has a transmittance of 90% to 95% for beams having a wavelength of 750 nm to 1000 nm and a transmittance of 55% to 65% for beams having a wavelength of 400 nm to 750 nm among beams incident on the lens module; and
an LED lamp that irradiates an infrared wavelength band of a beam for photographing the iris patterns forward, by being disposed around a front side of the camera module; and
the image conversion module, comprising:
a temporary memory for storing the iris pattern image; and
an image processor for converting the iris pattern image into a code and generating the iris pattern code.

14. The photographing module for iris authentication of claim 13, wherein the image conversion module further comprises an interface for transmitting the iris pattern code in connection with a terminal that authenticates the recognized person by using the iris pattern code.

15. The photographing module for iris authentication of claim 14, wherein the interface is connected with the terminal through a wired network using Ethernet.

16. The photographing module for iris authentication of claim 14, wherein the interface is connected with the terminal through a wireless network using one of CDMA and GSM forms.

17. The photographing module for iris authentication of claim 13, wherein the image processor is selected from one of DSP (Digital Signal Processing) and ROM-type chips.

18. A terminal having a photographing apparatus for authentication that photographs iris patterns of a recognized person and a general object, and authenticating the iris of the recognized person by photographing iris patterns of the recognized person to give a right to use and access to the recognized person, with the photographing apparatus for authentication, comprising:
the photographing apparatus for iris authentication that generates an iris pattern image by photographing the iris patterns of the recognized person and generates a general image by photographing the general object; wherein the photographing apparatus for iris authentication comprises:
a camera module composed of a lens module that configures a focus lens having a fixed focal distance by arraying more than one lens in a line and that moves in front/rear directions, and a pickup device that converts an image incident through the lens module into an electric signal by being disposed on a rear side of the lens module, and generating the iris pattern image by photographing the iris patterns while generating the general image by photographing the general object;

a band pass filter disposed in front of the camera module, wherein the band pass filter has a transmittance of 90% to 95% for beams having a wavelength of 750 nm to 1000 nm and a transmittance of 55% to 65% for beams having a wavelength of 400 nm to 750 nm among beams incident on the lens module; and an LED lamp that irradiates an infrared wavelength band of a beam for photographing the iris patterns in a forward direction, by being disposed around a front side of the camera module; and an image conversion module for converting the iris pattern image photographed by the photographing apparatus for iris authentication into a code wherein the image conversion module comprises:

a temporary memory for storing the iris pattern image; and an image processor for converting the iris pattern image into a code and generating the iris pattern code; and wherein the iris authentication of the recognized person is conducted by comparing the iris pattern code with an iris authentication code registered by previously photographing iris patterns of a user permitted to access the terminal.

19. The photographing apparatus for iris authentication of claim 18, wherein the terminal further comprises:

a local connector for data communication within the terminal;

a memory for storing the iris authentication code; and a processor for authenticating the recognized person by comparing the iris pattern code with the iris authentication code; and wherein the image conversion module further comprises an interface for transmitting the converted iris pattern code in connection with the local connector.

20. The terminal having the photographing apparatus for authentication of claim 19, wherein the interface and the local connector are connected through one of UART (Universal Asynchronous Receiver/Transmitter), PS/2, and USB (Universal Serial Bus) terminals.

21. The terminal having the photographing apparatus for authentication of claim 19, wherein the processor controls the terminal to access a DB server and a remote authentication server that provides a particular service to the recognized person, according to the compared results of the iris authentication code and the iris pattern code.

22. The terminal having the photographing apparatus for authentication of claim 19, wherein the memory is selected from one of CF card, XD card, SD card, smart media, memory stick and smart card memories.

23. The terminal having the photographing apparatus for authentication of claim 18, wherein the terminal further comprises an output device that carries out at least one of display and alarm outputting processes for the compared results of the iris authentication code and the iris pattern code.

24. The terminal having the photographing apparatus for authentication of claim 18, wherein the terminal is selected from one of PC, PDA, portable phone, navigation, Digital Multimedia Broadcasting (DMB) and Point to Multi-Point (PMP) terminals.

* * * * *